(12) United States Patent
McWilliams

(10) Patent No.: US 12,191,701 B2
(45) Date of Patent: Jan. 7, 2025

(54) APPARATUS, SYSTEM AND METHOD FOR ULTRA-RAPID INCREMENTAL MOBILE DEVICE CHARGING

(71) Applicant: Thomas J. McWilliams, Bryn Mawr, PA (US)

(72) Inventor: Thomas J. McWilliams, Bryn Mawr, PA (US)

( * ) Notice: Subject to any disclaimer, the term of this patent is extended or adjusted under 35 U.S.C. 154(b) by 185 days.

(21) Appl. No.: 16/661,695

(22) Filed: Oct. 23, 2019

(65) Prior Publication Data

US 2020/0136419 A1 Apr. 30, 2020

Related U.S. Application Data

(60) Provisional application No. 62/749,968, filed on Oct. 24, 2018.

(51) Int. Cl.
| | |
|---|---|
| *H02J 7/02* | (2016.01) |
| *G06Q 20/32* | (2012.01) |
| *H02J 7/00* | (2006.01) |

(52) U.S. Cl.
CPC .............. *H02J 7/02* (2013.01); *H02J 7/0047* (2013.01); *G06Q 20/3278* (2013.01)

(58) Field of Classification Search
CPC ....................................................... H02J 50/10
See application file for complete search history.

(56) References Cited

U.S. PATENT DOCUMENTS

| | | | | |
|---|---|---|---|---|
| 8,310,201 B1* | 11/2012 | Wright | ................... | G08C 17/02 |
| | | | | 320/108 |
| 10,601,232 B1* | 3/2020 | Wurmfeld | ............... | H02J 7/025 |
| 2004/0066169 A1* | 4/2004 | Bruning | .................. | H02J 7/025 |
| | | | | 320/108 |
| 2010/0207575 A1* | 8/2010 | Pijnenburg | ............... | H04B 5/79 |
| | | | | 320/108 |
| 2012/0150670 A1* | 6/2012 | Taylor | .................... | G06Q 30/06 |
| | | | | 705/16 |
| 2013/0266141 A1* | 10/2013 | Kim | ................... | G06Q 20/4014 |
| | | | | 380/270 |
| 2016/0004945 A1* | 1/2016 | Wade | ........................ | G07F 7/00 |
| | | | | 235/492 |
| 2016/0020632 A1* | 1/2016 | Lickfelt | .................. | H02J 50/80 |
| | | | | 320/108 |

(Continued)

*Primary Examiner* — Drew A Dunn
*Assistant Examiner* — Tynese V McDaniel
(74) *Attorney, Agent, or Firm* — Riverside Law LLP

(57) ABSTRACT

A system, method and apparatus for ultra-rapid mobile device charging. The apparatus, system and method may include a mobile tap station having a principal non-charging use; a high-energy rapid charging near field circuit capable of providing a high energy burst to the mobile device upon association of the mobile device with the mobile tap station, wherein the high energy burst is limited in field size by the high-energy rapid charging near field circuit to extending only to approximately the physical dimensions of the mobile device; a proximity sensor that limits the high energy burst to occurring only upon suitable placement of the mobile device in association with the mobile tap station; and a back end processing application that limits the high energy burst to a particular strength and duration dependent upon output from the proximity sensor, the principal non-charging use, and a type of the mobile device.

15 Claims, 2 Drawing Sheets

(56) References Cited

U.S. PATENT DOCUMENTS

| | | | | |
|---|---|---|---|---|
| 2017/0373524 | A1* | 12/2017 | Wright | H02J 50/23 |
| 2018/0047023 | A1* | 2/2018 | Bouda | H04L 9/3226 |
| 2018/0096405 | A1* | 4/2018 | Cho | G06Q 30/06 |
| 2018/0191205 | A1* | 7/2018 | Koeppel | H04W 76/10 |
| 2018/0351388 | A1* | 12/2018 | Orris | H02J 7/025 |
| 2019/0363584 | A1* | 11/2019 | Leem | H01Q 13/00 |
| 2020/0036213 | A1* | 1/2020 | Jeon | H04B 5/79 |
| 2020/0286070 | A1* | 9/2020 | Garrett | H04B 5/0031 |

* cited by examiner

APPARATUS, SYSTEM AND METHOD FOR ULTRA-RAPID INCREMENTAL MOBILE DEVICE CHARGING

CROSS-REFERENCE TO RELATED APPLICATION

This application claims the benefit of priority to U.S. Provisional Application No. 62/749,968, filed Oct. 24, 2018, entitled Apparatus, System and Method for Ultra-Rapid Incremental Mobile Device Charging, the entirety of which is incorporated herein by reference as if set forth in their entirety.

BACKGROUND

Field of the Disclosure

The present disclosure relates to mobile device charging, and, more specifically, to an apparatus, system and method for ultra-rapid incremental mobile device charging.

Description of the Background

With the significant proliferation of mobile devices in the modern environment, the fact that such devices are inherently battery-operated has provided significant limitations on the usability of the devices, both in the time of use and the context of use. More particularly, the use, such as by "power users", of respective mobile devices inevitably leads to a decrease in each device's battery power until the battery reaches a point where the device is no longer functional. Needless to say, unless the mobile device user is in a use-context immediately proximate to a recharging location or a wall plug at that time of urgent need, such loss of the use of the user's mobile device may lead to impediments to performing employment tasks, personal and social tasks, educational tasks, or worse, may curtail the user's safety and security dependent upon the physical environment in which the user resides when his or her phone "dies".

Consequently, there has been significant pursuit in the mobile device industry of so-called "wireless charging". However, wireless charging is subjected to severe and significant limitations, as well as prospective environmental safety issues, which are unlikely to be overcome in the near term. More particularly, wireless charging necessitates the radiation of energy in order to charge nearby mobile devices.

Of course, not only can such radiated energy cause interference with and/or otherwise be a detriment to the use of other nearby electronic devices, but, more disconcertingly, necessarily all living beings, such as humans, pets, and the like, in or near the radiated power field are subjected to the radiated energy. While it has only been theorized that this radiated energy may have detrimental effects on these living beings, the public concern is already proving an impediment to proliferation of wireless charging technology.

Of the many mobile device uses that draw on available battery power, one of the more recent power-consuming uses that has entered the mobile device economy is so-called "mobile pay" offerings. By way of non-limiting example, such mobile pay offerings include financial information, which may be stored on the mobile device of the user, such as in association with an "app" such as Google Pay or Apple Wallet, and which "connects" to various methodologies by which the mobile device user may pay for goods and services. Stored information may include, by way of non-limiting example, credit card information, secure payment site information, bank account information, or the like.

It is typical that a mobile payment is undertaken by the user when the user physically "taps" his or her phone to a payment station, such as a small, relatively flat-faced device which may be powered and associated with a check out terminal at a retail establishment. Upon the "tap", the user may enter security information to allow access by a payment processing "back-end" through the payment station to the user's information resident on the mobile device. Such security credentials may include, by way of nonlimiting example, the user's the biometric clearance, such a facial scan, a thumbprint, or the like, or may include the user's entry of "hard credentials", such as a clearance code or a security code.

Upon the user's entry of security credentials and the consequent clearance to allow access by the payment station/system to the application on the user's device that includes the financial information, the payment station accesses a mobile device through one of several communication hardware and software protocols in order to receive the payment information and send it for processing, such as to the software back end, referenced above, which is communicatively associated with the payment station. Such hardware and software that may effectuate the reading from the application on the mobile device may include, by way of example, near field communication (NFC) tags, near field Bluetooth, and/or the like.

In all such mobile payment cases, it is most typical that the mobile device must be highly physically proximate to the payment station to which it is tapped in order for the payment station to access the information on the application of the mobile device. This is done for a variety of reasons, including the enhanced security provided by the immediacy of close contact between the mobile device and the payment station reader, and further so that any energy radiated from the payment station or from the mobile device does not stray and/or affect the user.

Moreover, the wireless charging of the known art as discussed herein above is, at present, exclusively a "slow charge" methodology. This is the case for a number of reasons, including because air is the medium of travel for the recharging energy to which the mobile devices are subjected and there is generally a significant amount of air between the charger and the subject mobile device. It will be further appreciated that the level of the radiated energy cannot be significantly enhanced, at least because any living being in the presence of the recharging energy radiater would then be irradiated with more significant levels of energy. Accordingly, wireless recharging remains a slow process, and one in which typically only very low levels of recharging are available over a very lengthy period of time.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

Figure 1:
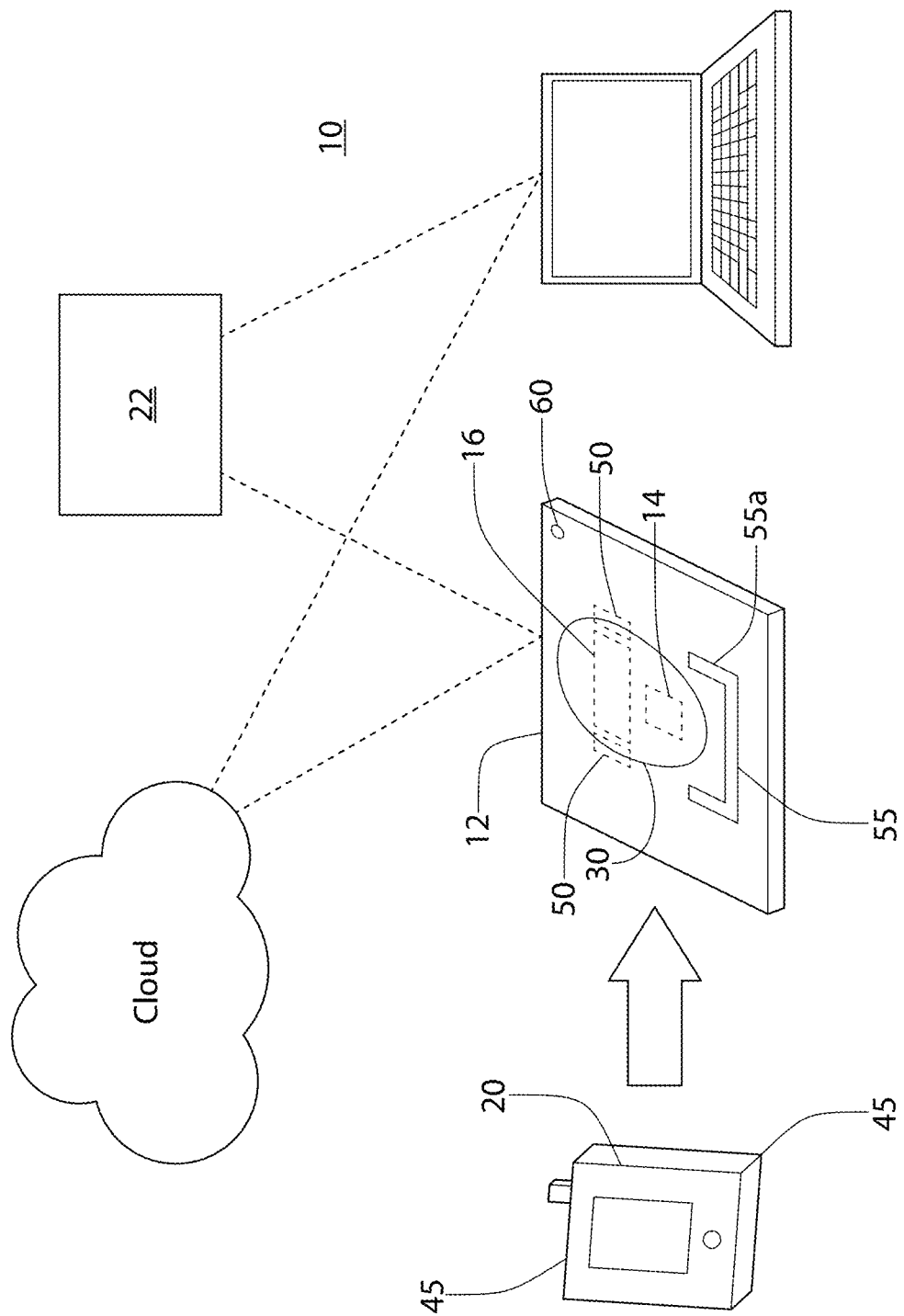
FIG. 1 is an illustration of the disclosed embodiments.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

As discussed herein, ultra-rapid mobile device charging is provided by the disclosure. In ones of the embodiments, this charging is incremental in nature, and may occur only when the subject mobile device is used in conjunction with a proximity-receiver system to convey secure user information through that proximity-receiver system. Contexts of such use may include, by way of example, financial transactions, such as during retail purchases or during banking transactions, and user-entry transactions, such as during actuation of locking doors, by way of non-limiting example.

FIG. 1 illustrates an ultra-rapid recharging system 10 in accordance with the embodiments. As illustrated in FIG. 1 the system 10 may include one or more mobile payment stations 12, each of which may include one or more NFC tags or near field Blue Tooth transceiver systems 14, and a high-energy rapid charging near field circuit 16. Of note, the high-energy charging circuit 16 may, for example, comprise a proximity charging from the NFC tag itself included in the payment processing system, or may be a separate high-energy recharging circuit actuated only in accordance with "permission" from the NFC tag (or near field Bluetooth) that a mobile device is present and is properly positioned with regard to the near field high-energy recharging circuit.

More particularly, the high energy recharge circuit 16 may provide either a contact or field-based energy transfer. By way of non-limiting example, as such the circuit 16 may be inductive, conductive, or radiative, as will be appreciated to those of ordinary skill in the pertinent art. Moreover, the circuit 16 may preferably be capable of generating the directive and/or limited recharging energy emissions discussed throughout. Yet further, it will be appreciated that the maximum energy emitted by circuit 16 may preferably be correspondent to the maximum energy that may be received by a mobile device 20 at any given time.

In accordance with the foregoing, upon the presence of a mobile device 20 upon the payment station 12, the recharging circuit 16 may be actuated as discussed herein. More particularly, the recharging circuit 16 may be highly directional due to the immediately proximate nature of the mobile device, as may be verified by the payment processing system back-end 22. Thereby, the radiated energy/proximity charging field 30 may extend only a short distance beyond the front of the payment station 12, such as only to the depth of a typical mobile device 20, such as approximately one quarter of an inch. Moreover, the radiated/proximity field 30 may extend only to the height, depth and width of the physical area 45 upon which the mobile device must be placed for payment processing. As such, and contrary to the known art, a high-energy field may be provided to the mobile device, but without increased likelihood that the radiated energy may stray to affect a living being nearby, including the living being holding the mobile device, due to the verification that the mobile device 20 is in proper position with respect to the charging field 30. Of course, one or more other features, such as directional radiaters/antenna and/or insulators 50, may be included in the embodiments in order to optimally direct the charging field such that stray energy radiation is not emitted.

In relation to the foregoing, the payment station of the referenced embodiments may also optionally include one or more physical "guides" 55, in order to most suitably position a mobile device being interacted with the payment station upon the charging circuit. For example, a lower tray having upturned corners 55a, as illustrated in FIG. 1, may provide the ability for a user to readily place a mobile device of varying sizes into the payment station within the bounds of the corners, while still allowing the user to have his or her fingers on either or both sides of the mobile device. Further, other indicators 60 may be provided, such as LED indicators, an audible sound, or the like, to indicate the proper positioning of the mobile device 20 before the charge field 30 is emitted.

With regard to the level of energy provided to a mobile device by the charge field 30 in accordance with the embodiments, it is presently the case that various mobile devices can accept varying degrees of recharging energy, either through a wired recharge or via a wireless or contact recharge. Of course, it is likely that, subsequent to the making of this disclosure, mobile devices will more readily accept higher amounts of energy in order to more rapidly receive a recharge, but in all such cases part of the information delivered to the payment station when the phone is tapped thereon may include the type of phone, and hence the maximum level of recharge energy that may be received by the phone, and/or other information indicative of the maximum recharging capabilities of the mobile device.

It should further be noted, in light of the discussion herein, that the disclosure does not necessarily envision a full recharge of the phone in the use of the embodiments. More particularly, as mobile payment systems typically perform processing in a "tap" lasting between 5 and 15 seconds, it is the case that the phone will be associated with the recharging circuit only for this same duration of time, in order to maintain the safety of the charge field as discussed herein. As such, it may be that the maximum total recharging energy that is delivered to the device is only that which can be received by the device during the 5 to 15 second span during which the device is placed on the payment station. Consequently, until mobile devices become suitable to receive more energy over a shorter period of time, it may be that a recharge of only 5 to 15% may be provided in the embodiments during the 5 to 15 seconds during which the mobile device is present on the pay station. Of course, as mobile device charging capabilities advance, the disclosure envisions higher percentages of recharging will be made available in very limited "tap" times without straying from the disclosed embodiments.

The foregoing notwithstanding, as mobile pay stations are becoming more prevalent, it is highly likely that the user may use more than one mobile pay station during a given timeframe, such as during each day. That is, if a user uses three mobile pay stations per day, on average, that user may receive, for example, an approximately 30% total recharge of the user's phone over the course of that day (using the exemplary ranges for time of presence and recharge energy provided above). It goes without saying that the foregoing alleviates many of the significant disadvantages discussed above with regard to both loss of mobile device battery power over the course of the day and in relation to the wireless charging of the known art, as even a 25 to 30% added recharge safely received by mobile device over the course of a given day, without the need to plug in the device, place the device on a wireless charging mat, or create a danger to living beings by generating a large over-the-air wireless field, constitutes significant improvements in the disclosed embodiments over the known art.

It will further be understood that the pay station in accordance with the embodiments may have both transceiving and presence back end software. That is, in addition to the software typical of a pay station for processing payments, additional back end software (local or remote; associated with the pay station processing, or discrete from the payment processing software) may confirm that a phone is suitably positioned before recharging is allowed to occur. By way of example, the user's phone may have two "apps" thereon, such as one for rapid recharging and one for mobile pay, or may have available to him or her one or more options within a mobile payment app to also for receiving of rapid recharging upon use mobile pay (when and where available). In either case, it will be appreciated that the user may also select various optionality in such an app, such as to only receive a recharge when a mobile device battery falls below a certain level, and/or to only receive a recharge when the mobile device is present on the payment station for more than 2 seconds, and so on.

In light of the foregoing and by way of nonlimiting example, a user may approach a pay station with a mobile device and tap his or her phone thereon to proceed with a mobile payment. An NFC tag (or Bluetooth presence sensor, by way of example) embedded in the pay station may sense the presence of the mobile device, and may begin to transact with the transceiving software and hardware of the backend in order to authorize the user's payment. In conjunction with the payment processing, the NFC tag, for example, may also receive recharging information, such as permission to proceed with a recharge, and may accordingly actuate a rapid recharge circuit, either as an aspect of the NFC tag itself or from a separate circuit in communication with the NFC tag. In some instances, if the charge level of the phone is at critical levels, the period of the tap of the phone may be optionally extended by seconds (or some other timeframe) by the charging software before payment authorization is indicated to the user, such as so that the recharge time is extended and the battery recharge thereby increased.

It will further be understood in light of the discussion herein that the embodiments may be used in various additional ways. By way of example, rapid recharge kiosks might be provided, which may or may not be associated with payment processing systems. Further, rapid recharge systems may be directed to the phone battery, or may additionally or instead be directed to recharging so-called "battery cases", in which a secondary battery is associated with the mobile device.

Yet further, security of the user's information may be a significant consideration in the embodiments. By way of example, it may be presumed that the user's use of the mobile pay station includes the user's permission to access the user's financial information within the mobile pay app. However, whether the recharge permission is included in a separate app or in the mobile pay app, as discussed above, other information on the mobile device may not be accessible to the "charging back end" discussed throughout absent additional user permissions, as will be understood to the skilled artisan.

Additionally, the embodiments may include recharging in other circumstances in which a phone "tap" occurs. By way of example, an ultra-rapid recharge may be provided to the extent a phone is used to identify and/or authorize access to monies, such as via an ATM, access to open a lock, such as to a hotel room or office door, or the like.

Figure 2:
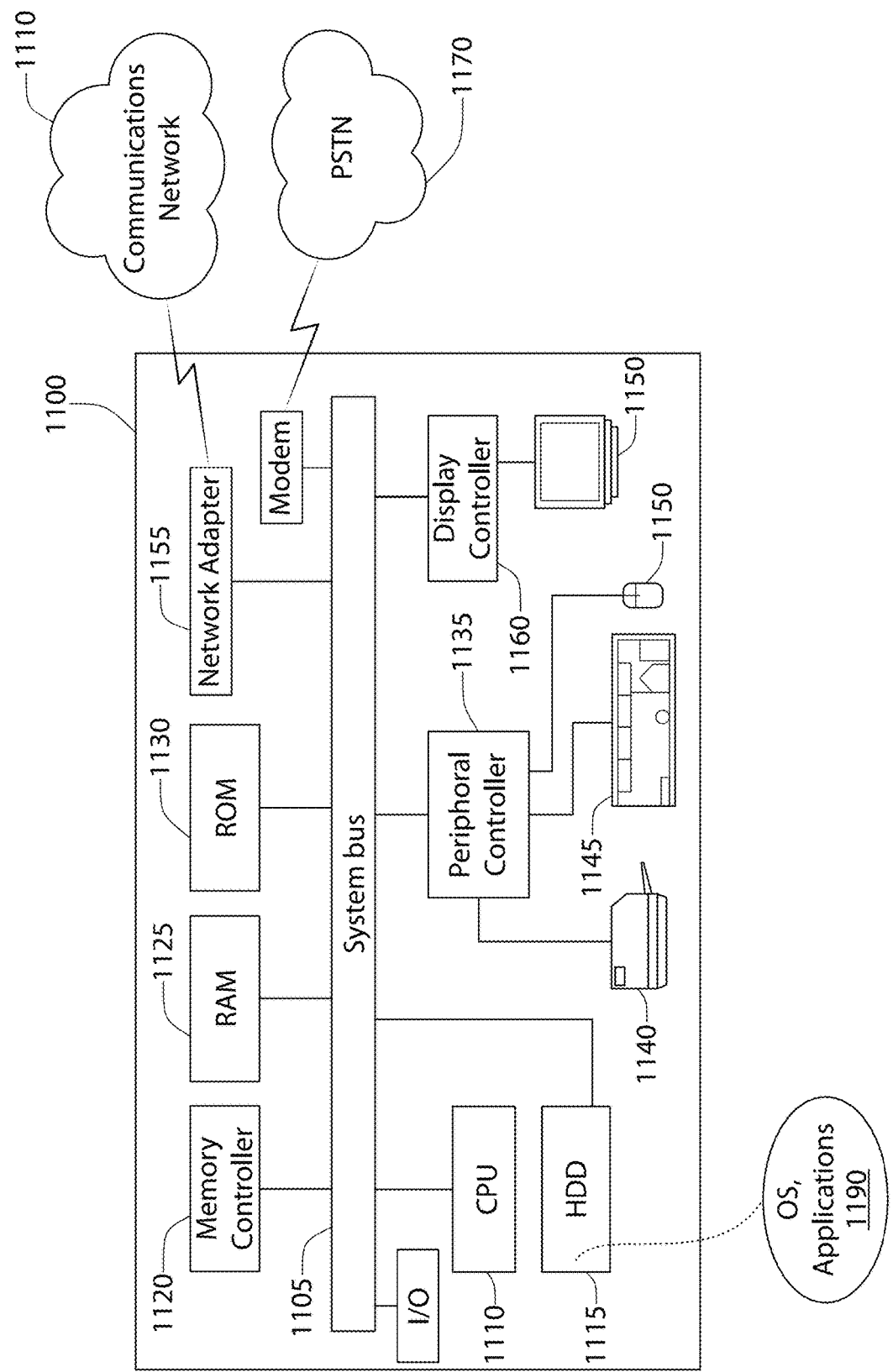
FIG. 2 is an illustration of the disclosed embodiments.

FIG. 2 depicts an exemplary computing system 1100 for use in association with the various computing aspects of the herein described systems and methods. Computing system 1100 is capable of executing software, such as an operating system (OS) and/or one or more computing applications/ apps/algorithms 1190, and may execute such applications by sending data to, and by using data received at, the I/O port.

The operation of exemplary computing system 1100 is controlled primarily by computer readable instructions, such as instructions stored in a computer readable storage medium, such as hard disk drive (HDD) 1115, optical disk (not shown) such as a CD or DVD, solid state drive (not shown) such as a USB "thumb drive," or the like. Such instructions may be executed within central processing unit (CPU) 1110 to cause computing system 1100 to perform the operations discussed throughout. In many known computer servers, workstations, personal computers, and the like, CPU 1110 is implemented in an integrated circuit called a processor.

It is appreciated that, although exemplary computing system 1100 is shown to comprise a single CPU 1110, such description is merely illustrative, as computing system 1100 may comprise a plurality of CPUs 1110. Additionally, computing system 1100 may exploit the resources of remote CPUs (not shown), for example, through communications network 1170 or some other data communications means.

In operation, CPU 1110 fetches, decodes, and executes instructions from a computer readable storage medium, such as HDD 1115. Such instructions may be included in software such as an operating system (OS), executable programs, and the like. Information, such as computer instructions and other computer readable data, is transferred between components of computing system 1100 via the system's main data-transfer path. The main data-transfer path may use a system bus architecture 1105, although other computer architectures (not shown) can be used, such as architectures using serializers and deserializers and crossbar switches to communicate data between devices over serial communication paths. System bus 1105 may include data lines for sending data, address lines for sending addresses, and control lines for sending interrupts and for operating the system bus. Some busses provide bus arbitration that regulates access to the bus by extension cards, controllers, and CPU 1110.

Memory devices coupled to system bus 1105 may include random access memory (RAM) 1125 and/or read only memory (ROM) 1130. Such memories include circuitry that allows information to be stored and retrieved. ROMs 1130 generally contain stored data that cannot be modified. Data stored in RAM 1125 can be read or changed by CPU 1110 or other hardware devices. Access to RAM 1125 and/or ROM 1130 may be controlled by memory controller 1120. Memory controller 1120 may provide an address translation function that translates virtual addresses into physical addresses as instructions are executed. Memory controller 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, computing system 1100 may contain peripheral communications bus 135, which is responsible for communicating instructions from CPU 1110 to, and/or receiving data from, peripherals, such as peripherals 1140, 1145, and 1150, which may include printers, keyboards, and/or the sensors, encoders, and the like discussed herein throughout. An example of a peripheral bus is the Peripheral Component Interconnect (PCI) bus.

Display 1160, which is controlled by display controller 1155, may be used to display visual output and/or presentation generated by or at the request of computing system 1100, responsive to operation of the aforementioned computing program. Such visual output may include text, graphics, animated graphics, and/or video, for example. Display 1160 may be implemented with a CRT-based video display, an LCD or LED-based display, a gas plasma-based flat-panel display, a touch-panel display, or the like. Display controller 1155 includes electronic components required to generate a video signal that is sent to display 1160.

Further, computing system 1100 may contain network adapter 1165 which may be used to couple computing system 1100 to external communication network 1170, which may include or provide access to the Internet, an intranet, an extranet, or the like. Communications network 1170 may provide user access for computing system 1100 with means of communicating and transferring software and information electronically. Additionally, communications network 1170 may provide for distributed processing, which involves several computers and the sharing of workloads or cooperative efforts in performing a task. It is appreciated that the network connections shown are exemplary and other means of establishing communications links between computing system 1100 and remote users may be used.

Network adaptor 1165 may communicate to and from network 1170 using any available wired or wireless technologies. Such technologies may include, by way of non-limiting example, cellular, Wi-Fi, Bluetooth, infrared, or the like.

It is appreciated that exemplary computing system 1100 is merely illustrative of a computing environment in which the herein described systems and methods may operate, and does not limit the implementation of the herein described systems and methods in computing environments having differing components and configurations. That is to say, the concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. An ultra-rapid mobile device charging system, comprising:
   a mobile tap station having a principal non-charging use of mobile payment processing of a mobile payment provided from the mobile device upon a tap of the mobile device to the mobile tap station;

a high-energy rapid charging near field circuit capable of providing a high energy field to the mobile device only during a 5-15 second time period of association of the mobile device with the mobile tap station simultaneously with, and solely for a duration of, the principal of non-charging use of the mobile payment processing, wherein the high energy field is limited in field size by the high-energy rapid charging near field circuit to extending only to approximately the physical dimensions, including depth, of the mobile device, and wherein the high energy field is limited to occurring only upon suitable placement of the mobile device in association with the mobile tap station; and a back end processing application that limits the high energy field to a particular strength and duration dependent upon output from the proximity sensor, the principal non-charging use, and a type of the mobile device.

2. The ultra-rapid mobile device charging system of claim 1, wherein the charging comprises only an incremental charging.

3. The ultra-rapid mobile device charging system of claim 1, wherein the principal non-charging use is provided by a near-field communication tag.

4. The ultra-rapid mobile device charging system of claim 1, wherein the principal non-charging use is provided by near-field Bluetooth.

5. The ultra-rapid mobile device charging system of claim 1, wherein the back end processing is included within application code for the principal non-charging use.

6. The ultra-rapid mobile device charging system of claim 1, wherein the back end processing is distinct from application code for the principal non-charging use.

7. The ultra-rapid mobile device charging system of claim 1, wherein the high energy field of the high-energy rapid charging near field circuit is contact-based.

8. The ultra-rapid mobile device charging system of claim 1, wherein the high-energy rapid charging near field circuit is one of inductive, conductive, or radiative.

9. The ultra-rapid mobile device charging system of claim 1, wherein the high-energy rapid charging near field circuit is directional.

10. The ultra-rapid mobile device charging system of claim 1, wherein a strength of the high energy field is limited based on the type of the mobile device.

11. The ultra-rapid mobile device charging system of claim 1, wherein the mobile device tap station comprises physical guides capable of suitably positioning the mobile device in relation to the high-energy rapid charging near field circuit.

12. The ultra-rapid mobile device charging system of claim 11, wherein the physical guides comprise a lower tray having upturned corners.

13. The ultra-rapid mobile device charging system of claim 1, further comprising a cognizable indicator of emission of the high energy field.

14. The ultra-rapid mobile device charging system of claim 13, wherein the cognizable indicator comprises a light emitting diode.

15. The ultra-rapid mobile device charging system of claim 13, wherein the cognizable indicator is audible.

* * * * *